United States Patent [19]

Cvetko et al.

[11] 3,909,009

[45] Sept. 30, 1975

[54] TONE ARM AND PHONOGRAPH PICKUP ASSEMBLIES

[75] Inventors: Henry J. Cvetko, Conneaut; Michael Williams, Warren, both of Ohio

[73] Assignee: The Astatic Corporation, Conneaut, Ohio

[22] Filed: Jan. 28, 1974

[21] Appl. No.: 436,914

[52] U.S. Cl. ........................ 274/37; 274/24

[51] Int. Cl.² ........................ G11B 3/02

[58] Field of Search ........................ 274/24, 31, 37

[56] References Cited

UNITED STATES PATENTS

| | | | |
|---|---|---|---|
| 3,219,764 | 11/1965 | Pritchard | 274/37 |
| 3,427,032 | 4/1969 | Zimmerman | 274/37 |
| 3,439,920 | 4/1969 | Van der Lely | 274/24 R |
| 3,602,519 | 8/1971 | Bubbers | 274/24 |

FOREIGN PATENTS OR APPLICATIONS

| | | | |
|---|---|---|---|
| 109,632 | 2/1940 | Australia | 274/37 |

*Primary Examiner*—Richard E. Aegerter
*Assistant Examiner*—A. J. Mirabito
*Attorney, Agent, or Firm*—Michael Williams

[57] ABSTRACT

Our invention provides a simple, yet very effective connection between a phonograph pickup cartridge and a phonograph tone arm. Both cartridge and tone-arm may be generally of standard construction except that one has a projection and the other has a socket for receiving the projection, whereby when the cartridge is moved to position within the cavity at the free end of the tone arm, the projection is seated within the socket to effect the assembly. In a preferred form, the projection extends upwardly from the top surface of the cartridge and frictionally fits within an opening in the upper wall of the tone arm, the upper portion of the projection being accessible so that the thumb of a person may be pressed thereagainst to cause disassembly of the cartridge from the tone arm.

8 Claims, 9 Drawing Figures

TONE ARM AND PHONOGRAPH PICKUP ASSEMBLIES

BACKGROUND OF THE INVENTION

Conventional phonograph pickup cartridges are usually held assembled within the hollow, free end of a tone arm by means of a mounting bracket and a screw connection. This has caused some problems when the cartridge is to be serviced or replaced, since working space is limited and therefore it is difficult to gain access to the bracket and screw.

Some improvements have been made to eliminate the bracket and screw, but the resulting connection between cartridge and tone arm has not been as rigid as we believe is necessary. In a known improvement, the cartridge has an upstanding hook member which fits through an opening in the tone arm and hooks over the upper surface of the latter. The biasing force of leaf spring electrical contacts is utilized to hold the hook member in assembled position with the tone arm and it is believed that such assembly is not firm enough for high fidelity sound reproduction.

Our invention provides a simple, yet effective, push-in connection between the cartridge and tone arm, and comprises a projection on one which is frictionally received within a socket in the other. Preferably, the projection is provided on the cartridge and extends from the upper wall thereof. This projection is adapted to frictionally fit within an opening in the upper wall of the tone arm, with the upper portion of the projection extending beyond such upper wall. An insignia may be provided on such upper portion for decorative or identifying purposes, and the cartridge may be easily removed from assembly with the tone arm by force applied to the upper portion to disengage the projection from the tone arm.

DESCRIPTION OF THE DRAWINGS

In the drawings accompanying this specification and forming a part of this application there are shown, for purpose of illustration, several embodiments which our invention may assume, and in these drawings.

DESCRIPTION OF THE PREFERRED EMBODIMENT

Figure 1:
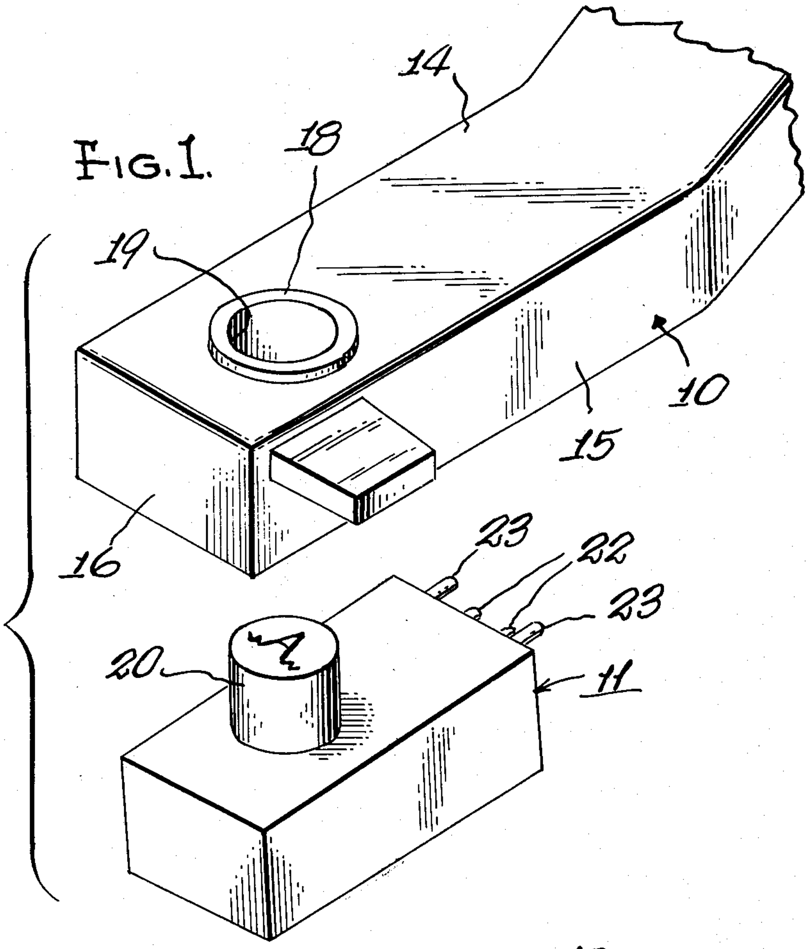
FIG. 1 is an enlarged, fragmentary perspective view showing our new and improved cartridge and tone arm in disassembled relation.
Figure 2:
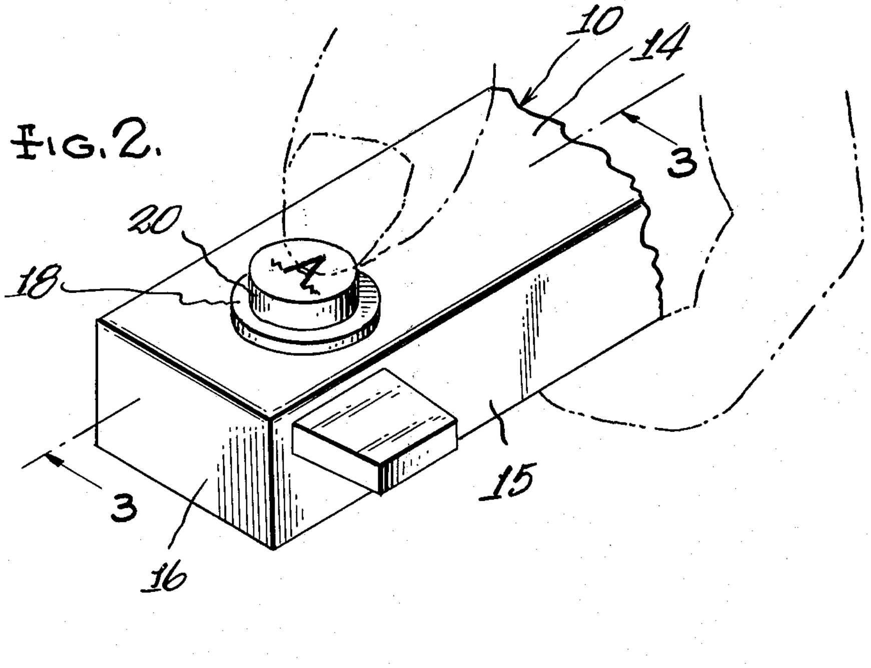
FIG. 2 is a view similar to FIG. 1 but showing the parts in assembled relation.

The tone arm 10 and phonograph pickup cartridge 11 may be generally of any standard construction, such as that disclosed in U.S. Pat. No. 2,601,126, issued June 17, 1952 to M. Palo, et al., and assigned to the assignee of the present application. The improved connection between the tone arm and cartridge comprises a projection on one fitting into a socket on the other so that by moving the cartridge into the hollow of the tone arm, the connection is made at the time the cartridge has been moved to its desired position.

As seen in FIGS. 1 through 6, the tone arm 10, at least at its free end, is formed as an inverted channel to form a cavity 12 comprising at top wall 14 and side walls 15—15. The front of the channel is preferably closed by an integral front wall 16. A socket is provided near the free end of the tone arm and in the preferred embodiment, the socket is formed as an opening 17 in the top wall 14. Preferably a plastic bushing 18 is securely held within the opening so that for production purposes the size of the opening 19 in the bushing may be closely held to definite tolerances and also that the wall defining the opening will provide a suitable frictional surface.

In the preferred embodiment, the cartridge 11 is provided with a projection 20 which is cylindrical in form and may be integral with the cartridge case or may be separated and secured thereto. The projection is of a diameter so that it will fit into the bushing opening 19 with a friction fit. Preferably, the projection has a slight taper from its base to its free end. A taper of about 3° has been found suitable to permit easy entrance of the free end of the projection into the bushing opening 19 and suitable friction fit therein.

The free end of the projection 20 extends beyond the upper wall 14 of the tone arm and may carry any suitable insignia. Disassembly of the cartridge from the tone arm is a simple matter and may be carried out by one hand of a person. As suggested in FIG. 2, a person may grasp the tone arm with the fingers of the hand underlying the tone arm and press the thumb against the extending part of the projection, and the cartridge will easily be dislodged from the tone arm.

Figure 4:
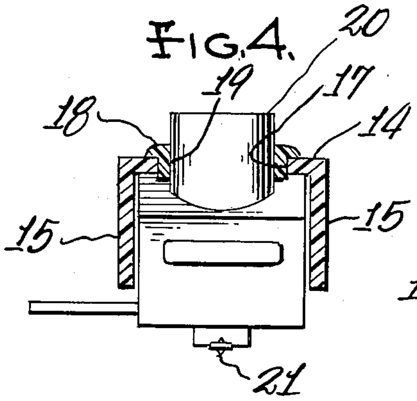
FIG. 4 is a transverse sectional view corresponding to the line 4—4 of FIG. 3.

In most cases, the frictional fit between the projection 20 and the wall surface defining the bushing opening 19 is sufficient to prevent rotation of the projection and the attached cartridge. However, the cartridge may be of a transverse size to snugly fit between the side walls 15—15 of the tone arm, as seen in FIG. 4, to insure against rotation of the projection with the bushing 18. The projection 20 and bushing opening 19 may be formed with means to provide for correct orientation of the cartridge relative to the tone arm, such as a key 20.1 (see dot-dash lines FIG. 3) fitting within a key-way within the bushing.

Figure 3:
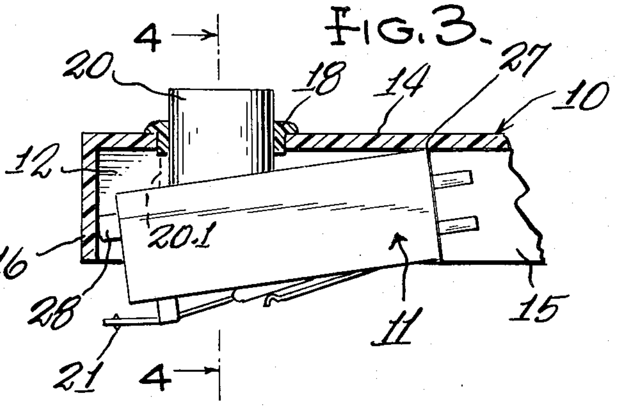
FIG. 3 is an enlarged, fragmentary, longitudinal sectional view corresponding to the line 3—3 of FIG. 2.

As best seen in FIG. 3, the longitudinal axis of the projection 20 is at an angle to the lonitudinal axis of the cartridge 11 so that when the projection is pushed into the bushing 18, the cartridge will be disposed at a correct angle relative to the tone arm 10 to dispose the stylus 21 for engagement with a phonograph record (not shown).

Figure 5:
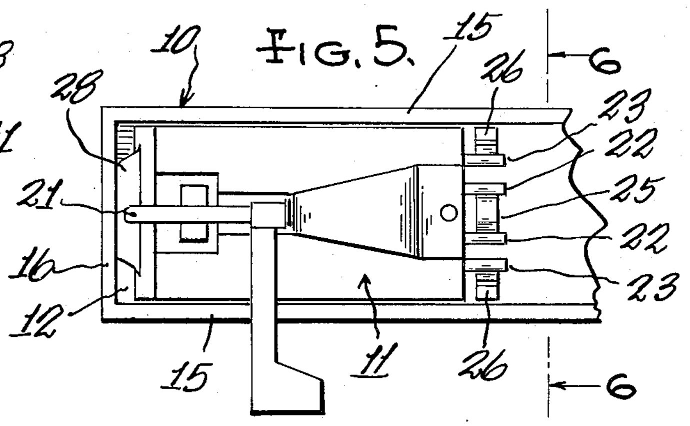
FIG. 5 is a fragmentary bottom view of the tone arm assembly.
Figure 6:
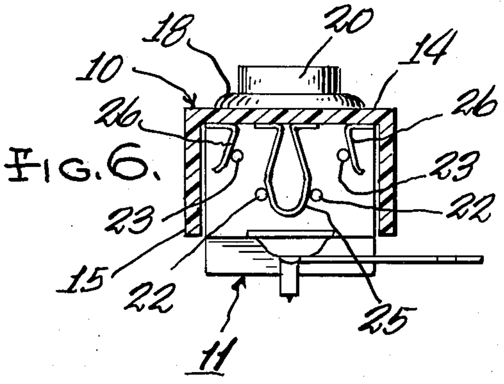
FIG. 6 is a transverse sectional view corresponding to the line 6—6 of FIG. 5, and FIGS. 7, 8 and 9 are views similar to FIG. 4, but showing other embodiments of our invention.

The conventional cartridge has terminals extending from its rear end and as seen in FIGS. 3, 5 and 6, the cartridge 11 has four terminals 22—22 and 23—23 since it is designed for binaural use. If the cartridge were designed for monaural use, the terminals 22—22 would be omitted. The terminals are adapted to be electrically connected to the electrical system (not shown) of the record player, and provision is herein made to automatically connect such terminals when the cartridge 11 is assembled with the tone arm. As best seen in FIG. 6, a spring contact 25 is carried by the tone arm 10 to bridge the terminals 22—22, and separating spring contacts 26—26 are carried by the tone arm to engage respective terminals 23—23. The contacts 25 and 26—26 are electrically connected by wires (not shown) to the electrical system of the record player and therefore when the cartridge 11 is assembled with the tone arm, the electrical connections are automatically made.

In order to limit the amount the projection 20 may be extended through the bushing 18, the rear upper end of the cartridge may engage the under surface of the tone arm 10, as seen at 27 in FIG. 3, or the cartridge may have a forward projection 28 engageable with the inner surface of the end wall 16. However, these limiting means may be of any other suitable form, or may be eliminated entirely.

DESCRIPTION OF THE OTHER EMBODIMENTS

Figure 7:
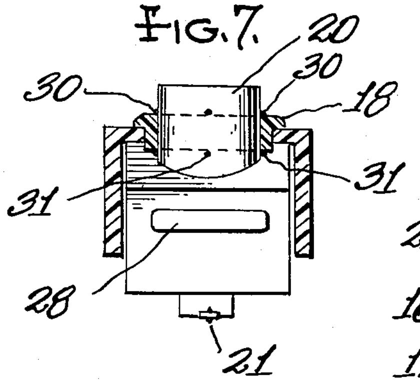

In some cases it is desirable to provide means on the projection 20 to define its extension through the bushing 18. In FIG. 7, the projection is formed with a series of abutments 30 and a spaced series of abutments 31 for engagement with opposite ends of the bushing 18. Instead of the spaced abutments, the projection may be formed with spaced annular ridges. The projection may be formed of material that has a slight resiliency so that the abutments 30 are slightly compressed as they are pushed through the bushing and then spring out to engagement with the upper end of the bushing. It will be appreciated that the required resiliency may be incorporated into the bushing, rather than in the projection.

Figure 8:
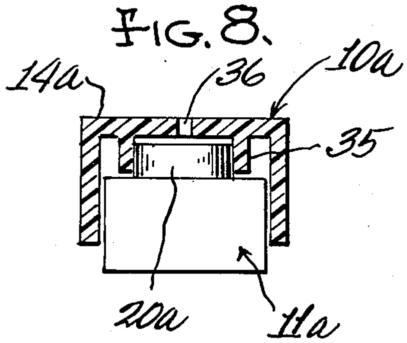
Figure 9:
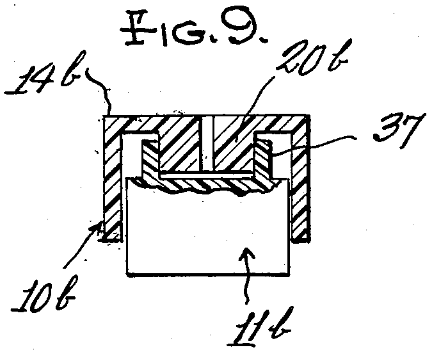

In some cases, it may be preferred that the projection does not extend upwardly from the top wall of the tone arm and in such cases the embodiments shown in FIGS. 8 and 9 may be used. In FIG. 8, the tone arm 10*a* is provided with a socket in the form of a tubular sleeve 35 integral with and extending downwardly from the inner surface of the top wall 14*a*. The cartridge 11*a* is provided with an upstanding projection 20*a*, as before, except in this case the projection is not as long as that previously described. The projection 20*a* frictionally fits within the socket 35 to effect its assembly with the tone arm 10*a*, and may bottom within the socket to define its location. A small opening or slot 36 is formed in the top wall 14*a* to pass a tool which may be pressed against the upper surface of the projection 20*a* to effect disassembly of the cartridge from the tone arm.

In the embodiment disclosed in FIG. 9, the socket is provided in the cartridge 11*b*, and is shown as a tubular sleeve 37 integral with and extending upwardly from the cartridge case. A projection 20*b* is provided on the tone arm, and is shown integral with and extending downwardly from the inner surface of the top wall 14*b* of the tone arm 10*b*. The socket 37 receives the projection 20*b* with a friction fit, as before.

In the foregoing description, reference is made to a tone arm and it is pointed out that this term is intended to include a shroud which sometimes is attached to a shorter tone arm, and which forms the free end of the tone arm. In such case, the cartridge-receiving cavity is formed in the shroud with the cartridge projection 20 fitting within a socket in the shroud. An example of a shroud may be found in catalog C-73 page 6 of The Astatic Corporation.

We claim:

1. An assembly for a record player, comprising:
a phonograph pickup cartridge, and a tone arm having a free end portion which is provided with a cavity which opens downwardly and has an upper defining wall, said cavity being adapted to receive said cartridge,
a projection rigidly connected to said wall and extending downwardly therefrom,
a sleeve rigidly connected to and extending upwardly from an upper portion of said cartridge, said sleeve having a transverse wall forming a bottom thereof,
and said upper defining wall and said projection having an opening in line with the interior of said sleeve, said opening being adapted to pass a tool which may be used to press against said sleeve bottom to dislodge said cartridge from assembly with said tone arm.

2. An assembly for a record player, comprising:
an oblong pickup cartridge, and an elongated tone arm having a free end portion provided with a longitudinally extending cavity opening from the underside of said tone arm,
said cartridge being disposed longitudinally within said cavity with its longitudinal axis at an acute angle with respect to the longitudinal axis of said tone arm whereby a stylus carried at the forward underside of said cartridge is disposed below said tone arm a distance sufficient to clear said tone arm and be disposed for engagement with a record,
and a connection between said tone arm and said cartridge, comprising a projection carried on one part and a socket carried on the other part, said projection fitting coaxially within said socket and being held therein by a frictional fit, the connection being effected solely by relatively moving said tone arm and cartridge to move said projection into said socket along the axis of the latter,
one of said projection and socket having its axis at a predetermined angle with respect to the longitudinal axis of the respective part on which it is carried so that axial movement of said projection into frictional fitting relation within said socket will correctly dispose said cartridge with its longitudinal axis at said acute angle with respect to the longitudinal axis of said tone arm.

3. The construction according to claim 2 wherein said cavity is defined by top and side walls of said tone arm,
wherein said projection is connected to the upper portion of said cartridge, and
wherein said socket is a sleeve connected to said top wall and extends downwardly into said cavity from an inner surface of said top wall,
said top wall having an opening adapted to pass a tool which may be used to press against the upper extremity of said projection to dislodge said cartridge from assembly with said tone arm.

4. The construction according to claim 2 wherein said cartridge has electrical terminal means and said tone arm has contact means electrically connected to the record player electrical system, said terminal means automatically engaging said contact means when said cartridge is moved to position within said tone arm cavity.

5. An assembly for a record player, comprising:
an oblong cartridge, and an elongated tone arm having a free portion provided with a longitudinally extending cavity opening from the underside of said tone arm and defined by top and side walls thereof,
said cartridge being disposed longitudinally within said cavity with its longitudinal axis at an acute angle with respect to the longitudinal axis of said tone arm whereby a stylus carried at the forward underside of said cartridge is disposed below said tone arm a distance sufficient to clear said tone arm and be disposed for engagement with a record, and a connection between said tone arm and said cartridge, comprising an opening through said top wall which is in communication with said cavity, and a projection extending from an upper surface of said cartridge and frictionally fitting within said opening, the connection being effected solely by relatively moving said tone arm and cartridge to move said projection into said opening for frictional interlocking fit with the defining wall thereof, the axis of said projection being at a predetermined angle with respect to the longitudinal axis of said cartridge so that axial movement of said projection into frictional locking relation with the defining wall of said opening will correctly dispose said cartridge with its longitudinal axis at said acute angle with respect to the longitudial axis of said tone arm.

6. The construction according to claim 5 wherein the relative transverse dimensions of said opening and said projection are such that frictional locking fit occurs after said projection has entered into said opening an amount wherein an upper portion of said projection extends above the upper surface of said top wall to be in position for application of a pressing force thereagainst to remove said projection from said opening and thereby provide for removal of said cartridge from said tone arm cavity.

7. An assembly for a record player, comprising:

a pickup cartridge, and a tone arm having a free end portion provided with a cavity opening from the underside of said tone arm defined by top and side walls of said tone arm, said cartridge fitting within said cavity, and a connection between said tone arm and said cartridge, comprising an opening through said top wall which is in communication with said cavity, and a projection extending from an upper surface of said cartridge and frictionally fitting within said opening, the relative transverse dimensions of said opening and said projection being such that frictional locking fit occurs after said projection has been entered into said opening an amount wherein an upper portion of said projection extends above the upper surface of said top wall to be in position for application of a pressing force thereagainst to remove said projection from said opening and thereby provide for removal of said cartridge from said tone arm cavity.

8. The construction according to claim 7 wherein said cartridge has electrical terminal means and said tone arm has contact means electrically connected to the record player electrical system, said terminal means automatically engaging said contact means when said cartridge is moved to its position within said cavity.

* * * * *